United States Patent [19]

De La Broise et al.

[11] Patent Number: 4,886,321

[45] Date of Patent: Dec. 12, 1989

[54] HYDRAULIC CIRCUIT FOR A MOTOR VEHICLE

[75] Inventors: Marc De La Broise, Bagneux; Christian Tanguy, Frepillon; Gilbert Kervagoret, Argenteuil, all of France

[73] Assignee: Bendix France, Drancy, France

[21] Appl. No.: 281,130

[22] Filed: Dec. 7, 1988

[30] Foreign Application Priority Data

Dec. 23, 1987 [FR] France .................. 87 17991

[51] Int. Cl.$^4$ ............................. B60T 17/18
[52] U.S. Cl. ...................... 303/92; 60/591; 303/111
[58] Field of Search ............ 60/563, 591; 303/92, 303/100, 110, 111, 114, 119

[56] References Cited

U.S. PATENT DOCUMENTS

| | | | |
|---|---|---|---|
| 4,229,049 | 10/1980 | Ando | 303/92 X |
| 4,676,558 | 6/1987 | Klein | 303/114 |
| 4,720,151 | 1/1988 | Belart et al. | 303/111 |
| 4,753,490 | 6/1988 | Belart et al. | 303/92 X |

FOREIGN PATENT DOCUMENTS

| | | |
|---|---|---|
| 1908282 | 2/1970 | Fed. Rep. of Germany . |
| 2059037 | 6/1972 | Fed. Rep. of Germany . |
| 3344547 | 6/1985 | Fed. Rep. of Germany . |
| 3615046 | 11/1987 | Fed. Rep. of Germany . |

Primary Examiner—Duane A. Reger
Attorney, Agent, or Firm—Larry J. Palguta; Ken C. Decker

[57] ABSTRACT

The circuit comprises a primary circuit (2) feeding brake motors (5) and (7) and a secondary circuit (3) feeding a brake motor (9). In normal operation a valve (11) isolates the brake motor (22) from the secondary circuit (3). The pressure in the primary circuit then controls the pressure prevailing in the brake motor (22) with the aid of a pressure balancing device (25) installed between the feed lines of the brake motors (7 and 22). In the event of the failure of the primary circuit (2) the valve (11) establishes communication between the brake motor (22) and the secondary circuit (3) to effect the braking of the wheel associated with the brake motor despite the fact that the balancing device (25) is put out of action in this situation. Application to a brake circuit equipped with an anti-wheel-lock device.

9 Claims, 1 Drawing Sheet

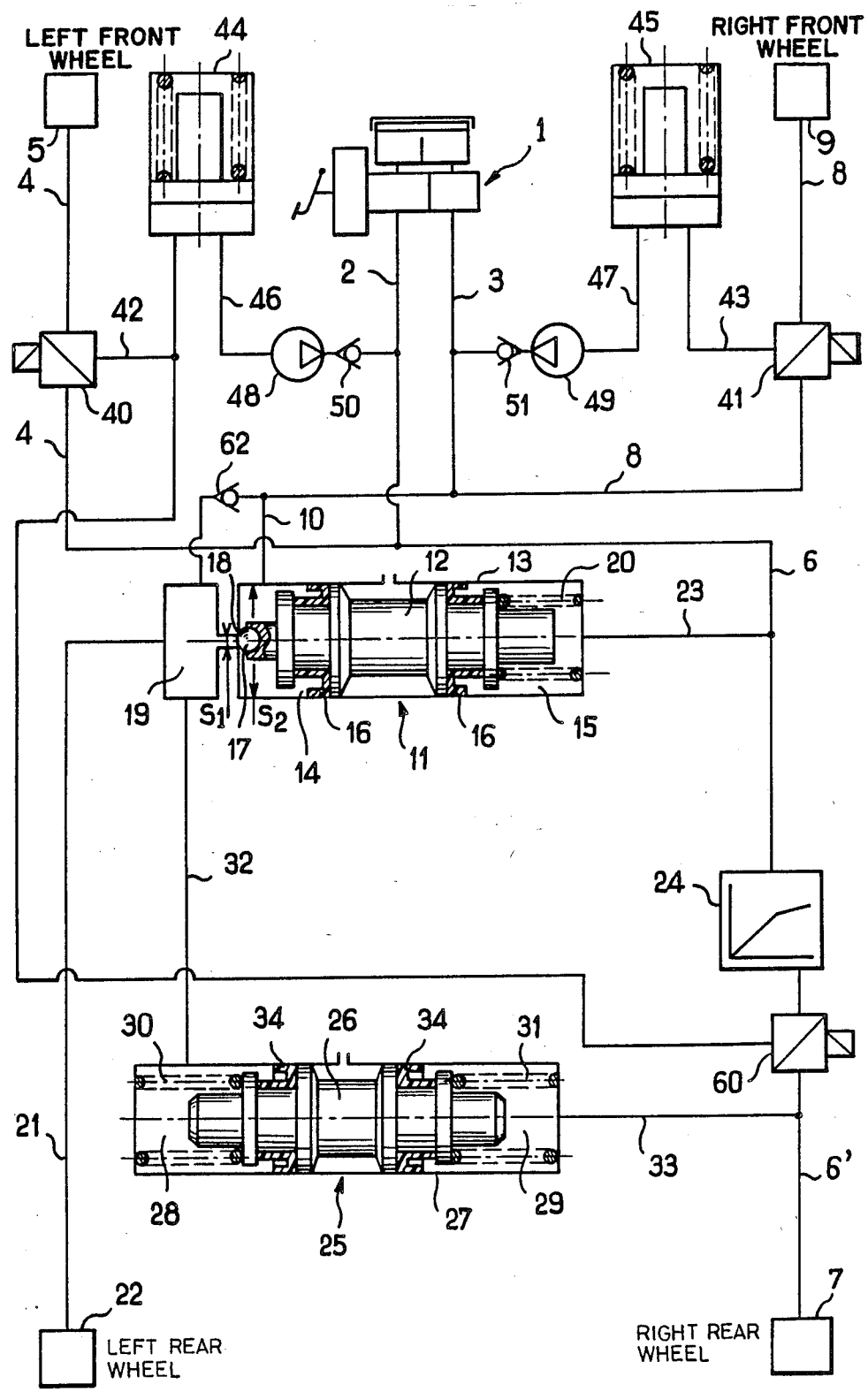

HYDRAULIC CIRCUIT FOR A MOTOR VEHICLE

The present invention relates to a hydraulic brake circuit for a motor vehicle, of the type comprising a primary circuit and a secondary circuit feeding brake motors associated with the wheels of the vehicle. It relates more particularly to a circuit of this kind which is equipped with means ensuring safe braking in the event of failure of one of the primary and secondary circuits feeding the brake motors.

From U.S. patent application No. 233,409 now Pat. No. 4,852,952 assigned to the same assignee as herein, a hydraulic brake circuit is known which comprises primary and secondary circuits disposed crosswise for feeding the wheel brake motors, this circuit being equipped with an anti-wheel-lock device of the type in which the brake fluid pressures in the front wheel brake motors are controlled separately, while the rear wheel having the lower road adherence controls the production of the same fluid pressure in the rear wheel brake motors, these pressures being governed by an admission-pressure reduction solenoid valve associated respectively with each of the front wheel brake motors and with the rear axle, each solenoid valve containing a pressure reduction valve. In the anti-wheel-lock period the circuit is replenished by a single pump connected directly on the suction side to the reservoir of a tandem master cylinder.

The circuit described in the aforesaid French patent application contains a safety device connected hydraulically to the pressure reduction valves of the solenoid valves and to the delivery side of the pump, and it is provided with a valve means controlled by the delivery pressure of the pump to isolate the pressure reduction valves of the solenoid valves from the master cylinder reservoir during normal braking, or in the event of the failure of the pump, and during anti-wheel-lock periods to return to the reservoir the brake fluid coming from these valves, when the fluid pressure delivered by the pump reaches a predetermined level indicating the correct operation of the pump.

Nevertheless, the device described above is not designed to ensure the safe braking of the vehicle in the event of the failure of one of the circuits, primary or secondary, feeding the brake motors.

The present invention seeks to provide a hydraulic brake circuit, optionally provided with an anti-wheel-lock device, which makes it possible to ensure safe braking of the vehicle in the event of the failure of one of the primary or secondary circuits feeding the brake motors.

The present invention also seeks to provide a brake circuit of this kind which permits the use of an anti-wheel-lock device containing a minimum of solenoid valves modulating the pressure in the brake motors and which makes it possible to balance the pressure in the rear wheel brake motors at the level of the lower of the two pressures both during normal braking and during anti-lock braking.

The present invention seeks in addition to provide a circuit of this kind which is equipped with a single corrector for simultaneously correcting the pressure of the brake motor of the rear axle wheels of the invention.

These aims of the invention are achieved with a hydraulic brake circuit for a motor vehicle, of the type which comprises a pressure generator for a brake fluid, a primary circuit controlled by said generator to feed the first and second brake motors associated with the first and second wheels respectively, which are mounted in diagonal positions on first and second axles respectively, a secondary circuit controlled by the generator to feed a third brake motor associated with a third wheel mounted on the first axle, in the other diagonal position, a fourth wheel being mounted on the second axle opposite said other diagonal position and being associated with a fourth brake motor, and a device balancing the pressures in the brake motors of the wheels of the second axle, this circuit being characterized in that it contains a valve sensitive to the fluid pressure in the primary circuit to connect the fourth brake motor to the secondary circuit in the event of the failure of the primary circuit.

In the accompanying drawing, given solely by way of example, the single FIGURE shows a diagram of the brake circuit according to the invention.

Reference is made to the drawing, in which it can be seen that the circuit according to the invention comprises a brake pressure generator 1, consisting for example of a brake servo unit associated with a conventional dual reservoir tandem master cylinder, said generator being operated by the brake pedal of a motor vehicle equipped with the circuit according to the invention. The tandem master cylinder of the generator 1 controls the pressurizing of two separate supply circuits for brake motors associated with the vehicle wheels, namely a primary circuit 2 and a secondary circuit 3. The primary circuit 2 supplies via a line 4 a first brake motor 5 associated with a first vehicle wheel and, via a line 6, a second brake motor associated with a second vehicle wheel. The first and second wheels are mounted respectively on the front axle and the rear axle of the vehicle. In the form of construction of the circuit shown in the drawing the first wheel is the left-hand front wheel and the second wheel is the right-hand rear wheel, the primary circuit thus adopting the conventional diagonal configuration. The secondary circuit 3 supplies via a line 8 a third brake motor 9 associated with a third vhicle wheel. In the embodiment shown in the drawing this third wheel is the right-hand front wheel.

According to an essential characteristic of the invention the secondary circuit 3 is also connected by a line 10 to an isolator valve 11, the operation of which will be explained later on. This isolator valve 11 consists essentially of a piston 12 adapted to move in a bore 13 between a first chamber 14 and a second chamber 15. Sealing cups 16 isolate an annular chamber surrounding the central portion of the piston 12 from the first and second chambers. In the first chamber 14 the piston carries axially a ball 17 adapted to come to close the seat of a valve 18 through which the chamber 14 can communicate with a third chamber 19. The second chamber 15 contains a spring 20 loading the piston 12, and therefore the ball 17, in the direction of the closed position of the valve 18.

A line 21 starting from the third chamber 19 feeds a fourth brake motor 22 associated with a fourth vehicle wheel. In the embodiment illustrated this fourth wheel is the left-hand wheel on the rear axle of the vehicle. A line 23 brings the second chamber 15 of the valve 11 into communication with the line 6 feeding the brake motor 7. On the line 6 the presence of a conventional pressure corrector 24 downstream of the connection of the lines 6 and 23 will also be noted.

Like the circuit described in the previously mentioned French patent, the circuit according to the invention also contains a device 25 for balancing the pressures in the brake motors 7 and 22 associated with the rear wheels. Reference may be made to this patent application for further details concerning the construction and operation of this balancing device. To summarize, the device 25 comprises a piston 26 adapted to remove in a bore 27 between two chambers 28 and 29 each containing a spring 30 and 31 respectively, which holds the piston 26 in a central balancing position when at rest. The first chamber 28 is connected by a line 32 to the third chamber associated with the valve 11, while the chamber 29 is connected by a line 33 to the line 6′ feeding the brake motor 7 and extending between the corrector 24 and said brake motor. Sealing cups 34 isolate an annular chamber surrounding the central portion of the piston 26 from the chambers 28 and 29.

The present invention is applicable both to a conventional brake circuit and to a brake circuit equipped with an anti-wheel-lock device. However, the drawing illustrates the application of the invention to a circuit equipped with an anti-lock device of this kind, for reasons which will be explained later on. The anti-lock device equipping the brake circuit according to the invention is of the conventional type comprising independent control of the front wheels and combined control of the rear wheels. In the lines 4 and 8 feeding the brake motors 5 and 9 respectively there are thus installed modulators 40 and 41 respectively controlling the pressure of the brake motors 5 and 9 during the anti-lock operation of the circuit according to the invention. Conventionally each of the modulators 40 and 41 may consist of a three-way, two-position solenoid valve. Likewise conventionally, these modulators 40 and 41 are connected by respective lines 42 and 43 to pressure accumulators 44 and 45, the outputs of which are connected by respective lines 46 and 47 to respective pumps 48 and 49 associated with non-return valves 50 and 51 respectively connected to the primary circuit 2 and to the secondary circuit 3 respectively downstream of the master cylinder of the brake pressure generator 1. The non-return valves 50, 51 prevent any return flow of brake fluid from the primary and secondary circuits to the respective pumps 48 and 49.

For the control of the pressures of the brake motors 7 and 22 associated with the wheels on the rear axle of the vehicle the anti-lock device of the circuit according to the invention contains a single modulator 60 disposed on the supply line of the brake motor 7, between the pressure corrector 24 and the point of connection of the line 33, coming from the balancing device 25, to the supply line 6′ of said brake motor 7. The modulator 60 is also connected to the inlet of the accumulator 44.

On a line establishing communication between the secondary circuit 3 and the third chamber 19 the presence of a non-return valve 62, the purpose of which will be explained later on, will also be noted.

In the absence of conditions giving rise to the operation of the anti-lock device, the brake circuit according to the invention functions in the following manner. When the brake pedal is depressed, the pressure produced by the brake pressure generator 1 is transmitted to the brake motors 5, 9 and 7 via the lines 4, 8 and 6 respectively, the modulators 40, 41 and 60 then having no effect on these lines. The pressure established in the line 6 is then also transmitted by the line 23 to the second chamber 15 of the valve 11 and, through the corrector 24 and the line 33, to the second chamber 29 of the balancing device 25. This pressure, added to that developed by the spring 20 in the chamber 15 of the valve has the effect of applying the ball 17 against the seat of the valve 18, thus preventing any communication between the chambers 14 and 19, so as to cut off all transmission of pressure between the secondary circuit 3 and the brake motor 22. According to the invention, during normal operation of the brake circuit the valve 11 therefore isolates the brake motor 22 from the secondary circuit 3. The brake motor 22 is however then brought into communication via the lines 21 and 32 with the chamber 28 of the balancing device 25. The springs 30 and 31 acting on the piston 26 of the device 25 have only slight power and act in such a manner that, when at rest, the piston 26 occupies a central position in the bore 27. In these circumstances an increase of pressure in the line 6, possibly corrected by the corrector 24, is transmitted to the chamber 29 in order to act on the piston 26, which is displaced to the left (referring to the drawing) to compress the fluid contained in the chamber 28, which is in communication with the brake motor 22 via the lines 32 and 21. The displacement of the piston 26 towards the left stops when the pressures prevailing on the two sides of the piston are balanced, that is to say when the fluid pressures in the brake motors 7 and 22 are equal. According to the invention the pressure in the brake motor 22 is thus pilot controlled by that established in the line 6′ supplying the brake motor 7, and balancing is thus effected between the brake pressures in the brake motors associated with the rear wheels of the vehicle, which is advantageous for the maintenance of the steerability of the latter, as is well known in the art.

When the brake pedal is released, the emptying of the brake motor 22 is facilitated by the presence of the non-return valve 62 communicating with the chamber 19. The residual pressure in the brake motor 22 when braking ceases can then be made very low (lower than 0.5 bar for example).

According to the present invention, the power of the spring 20 of the valve 11 gives rise to the opening of the valve 18 at a predetermined low pressure value, close to 5 bars for example.

Thus, in the event of the failure of the primary circuit 2, the brake pressure generator 1 continues to feed the secondary circuit 3 and, after the opening of the valve 18 and displacement to the stop on the right (referring to the drawing) of the piston 12 the generator 1 thus also feeds the brake motor 22 associated with the left-hand rear wheel by way of the third chamber 19 associated with the valve 11. Thus, according to the invention, despite the failure of the primary circuit 2, the supply of pressurized brake fluid to the secondary circuit is nevertheless still ensured. In the situation examined above there is no further limitation of pressure in the brake motor 22 associated with the left-hand rear wheel.

On the other hand, if there is a failure of the secondary circuit upstream of the isolator valve 11, the left-hand rear wheel will continue to be braked by the brake motor 22. If there is a failure of the brake circuit downstream of the isolator valve 11 for example in the lines 21 or 32, it is the right-hand front wheel that will continue to be braked.

The operation of the circuit according to the invention will now be examined in cases where the anti-lock device of the circuit is brought into action as the result of the detection of a condition of imminent locking of one of the wheels of the vehicle. In the absence of a failure of the primary and secondary circuits, the device then reacts independently on the two wheels of the front axle, as in conventional arrangements, and with the aid of the modulator 60 acts simultaneously on the two wheels of the rear axle in response to the detection of imminent locking of one of these two wheels, the balancing device 25 then establishing modulated brake pressure equality in the brake motors of the two rear wheels and the pressure then being established at the level of that required to prevent the locking of the rear wheel whose road adherence is the lower.

If the primary circuit 2 should fail while the anti-lock device of the circuit according to the invention is in operaion, the brake motor 22 will still be fed by the secondary circuit through the operation of the valve 11, and this will be done without any limitation of pressure in the brake motor 22. Maximum emergency brake efficiency is thus obtained even if one or both wheels associated with the secondary circuit is or are locked, the steerability and stability of the vehicle then being achieved through the wheels associated with the other circuit, which are not braked.

On the other hand, if there should be a failure of the secondary circuit upstream or downstream of the isolator valve 11, the situation will be as described above for the operation of the circuit according to the invention when the anti-lock device is not brought into operation.

The circuit according to the invention makes it possible to provide control of the operation of the anti-lock device in dependence on failure of either of the primary or secondary circuits.

As has been indicated above, it is clear that the invention can be applied in a brake circuit which may or may not be equipped with an anti-lock device. However, in cases where the invention is applied to a circuit equipped with a device of this kind, the following advantages are achieved:

the device contains a small number of pressure modulators, namely three in the embodiment described;

a single brake corrector is sufficient for the entire rear axle;

failure of the primary circuit is successfully compensated by operations, without limitation of pressure, of the brake motor associated with the left-hand rear wheel;

failure of the secondary circuit is attenuated by the operation of three out of four of the brake motors.

The invention is obviously not restricted to the embodiment described and illustrated, which has been given only by way of example and which effects the braking of four wheels distributed over the two axles of a private car. The scope of the invention also includes the application of the latter to a lorry having more than two axles, for which purpose the arrangement described above for the rear axle of a private car would be divided between the axles of the vehicle other than the front axle. The invention is also not restricted to a circuit in which the left-hand rear wheel is normally isolated from the secondary circuit, and the circuit described could be reversed in direction without departing from the scope of the invention.

The present invention makes it possible to provide a brake circuit which has improved reliability and which is suitable for the incorporation of an anti-lock device containing a small number of modulators and a single pressure corrector, so that it is inexpensive, while it is particularly suitable for adding to a conventional brake circuit comprising two independent crosswise supply circuits.

We claim:

1. A hydraulic brake circuit for a motor vehicle, comprising:
    a pressure generator for a brake fluid,
    a primary circuit controlled by said generator to feed first and second brake motors associated respectively with first and second wheels which are mounted respectively on first and second axles and in one diagonal direction,
    a secondary circuit controlled by the generator to feed a third brake motor associated with a third wheel mounted on the first axle in the other diagonal direction,
    a fourth brake motor being associated with a fourth wheel mounted on the second axle in said other diagonal direction, said fourth brake motor being disconnected from fluid pressure in the secondary circuit during normal braking operation,
    a balancing device for balancing pressures in the brake motors of the wheels of the second axle, said balancing device having a first chamber connected with the primary circuit and a second chamber connected with the fourth brake motor, and
    a valve sensitive to fluid pressure in the primary circuit to connect the fourth brake motor to the secondary circuit in event of failure of the primary circuit.

2. The circuit according to claim 1, wherein the valve comprises a piston movable in a bore between a first chamber closed by a closing valve element controlling an establishment of communication between the fourth brake motor and the secondary circuit, and a second chamber of the bore in communication with the primary circuit, the piston being movable in said bore between a first position in which the piston closes the closing valve element and cuts off all communication between the fourth brake motor and the secondary circuit during normal braking operation and at rest, and a second position in which the piston allows opening of the valve element to establish communication between the fourth brake motor and the secondary circuit in the event of failure of the primary circuit.

3. The circuit according to claim 2, wherein a calibrating spring is disposed in the second chamber of the valve to load the piston in a direction of the closing valve element, stiffness of the spring being such that the closing valve element opens when a difference between fluid pressures in said chambers becomes lower than a predetermined value.

4. The circuit according to claim 3, wherein the second chamber of said valve is connected with the primary circuit and the first chamber of said valve is connected with the secondary circuit and, in the event of failure of the primary circuit, with the fourth brake motor.

5. The circuit according to claim 4, wherein the closing valve element controls communication between said first chamber and a third chamber connected both to the fourth brake motor and to the second chamber of the balancing device.

6. The circuit according to claim 5, wherein a non-return valve brings said third chamber and the secondary circuit into communication in order to allow emptying of the fourth brake motor when braking ends during normal operation.

7. The circuit according to claim 6, further comprising a pressure corrector acting on the brake motors associated with the second axle, said corrector being connected in the primary circuit between connections with the valve and with the first chamber of said balancing device.

8. The circuit according to claim 7, further comprising an anti-wheel-lock device comprising a brake pressure modulator associated with each of the brake motors of the wheels associated with the first axle and a third brake pressure modulator associated with the brake motor of the second wheel mounted on the second axle, said third modulator being disposed in the primary circuit upstream of the first chamber of the balancing device.

9. The circuit according to claim 8, wherein said third modulator is disposed in the primary circuit downstream of said pressure corrector.

* * * * *